United States Patent
Koditkar

(10) Patent No.: US 9,759,358 B2
(45) Date of Patent: Sep. 12, 2017

(54) CONNECTOR ELEMENT

(71) Applicant: Automatic Switch Company, Florham Park, NJ (US)

(72) Inventor: Parijat A. Koditkar, Pune (IN)

(73) Assignee: AUTOMATIC SWITCH COMPANY, Florham Park, NJ (US)

( * ) Notice: Subject to any disclaimer, the term of this patent is extended or adjusted under 35 U.S.C. 154(b) by 229 days.

(21) Appl. No.: 14/488,986

(22) Filed: Sep. 17, 2014

(65) Prior Publication Data

US 2015/0152985 A1    Jun. 4, 2015

(51) Int. Cl.
| | |
|---|---|
| F16L 19/08 | (2006.01) |
| F16L 15/08 | (2006.01) |
| F16L 19/02 | (2006.01) |
| F16L 25/00 | (2006.01) |
| F16L 37/091 | (2006.01) |

(52) U.S. Cl.
CPC ......... F16L 15/08 (2013.01); F16L 19/0206 (2013.01); F16L 25/009 (2013.01); F16L 37/091 (2013.01)

(58) Field of Classification Search
USPC .............. 285/247, 340, 354, 382.1, 251
See application file for complete search history.

(56) References Cited

U.S. PATENT DOCUMENTS

| | | | | |
|---|---|---|---|---|
| 4,402,773 A * | 9/1983 | Morrill | ............... | E21B 33/047 285/123.12 |
| 4,832,381 A * | 5/1989 | Boulton | ............... | E21B 33/047 277/621 |
| 6,264,250 B1 * | 7/2001 | Teraoka | ............... | F16L 19/086 285/340 |
| 7,611,172 B2 * | 11/2009 | Baving | ............... | F16L 37/091 285/322 |
| 7,878,555 B2 * | 2/2011 | Oh | ............... | F16L 19/086 285/319 |
| 8,303,001 B2 * | 11/2012 | Oh | ............... | F16L 25/0045 285/340 |

(Continued)

FOREIGN PATENT DOCUMENTS

WO    2013056273    4/2013

OTHER PUBLICATIONS

Vecchio, G., International Search Report for International Patent Application No. PCT/US2014/056084, European Patent Office, dated Nov. 24, 2014.

(Continued)

*Primary Examiner* — Aaron Dunwoody
(74) *Attorney, Agent, or Firm* — Locke Lord LLP

(57) ABSTRACT

A connector element is disclosed in accordance with one embodiment of the present disclosure. The connector element is for coupling a first tubular element to a second tubular element, wherein the second tubular element is having an end configuration selected from a threaded end configuration and a non-threaded plain configuration. The connector element is having a threaded element complementary to the threads of the threaded end configuration of the second tubular element, a tube lock that is co-axially arranged with respect to and disposed downstream of the threaded element for holding the second tubular element, and a guide element that is co-axially arranged with respect to and disposed down-stream of the tube lock for guiding the second tubular element.

8 Claims, 4 Drawing Sheets

(56) References Cited

U.S. PATENT DOCUMENTS

| | | |
|---|---|---|
| 2003/0230896 A1 | 12/2003 | Riedy |
| 2005/0035597 A1* | 2/2005 | Bamberger ........... F16L 37/091 |
| | | 285/340 |
| 2005/0264005 A1 | 12/2005 | Norman |
| 2006/0232067 A1* | 10/2006 | Kwak ................... F16L 37/091 |
| | | 285/354 |
| 2012/0248764 A1 | 10/2012 | Erickson |
| 2012/0326439 A1 | 12/2012 | Bogert |

OTHER PUBLICATIONS

Vecchio, G., Written Opinion for International Patent Application No. PCT/US2014/056084, European Patent Office, dated Nov. 24, 2014.

* cited by examiner

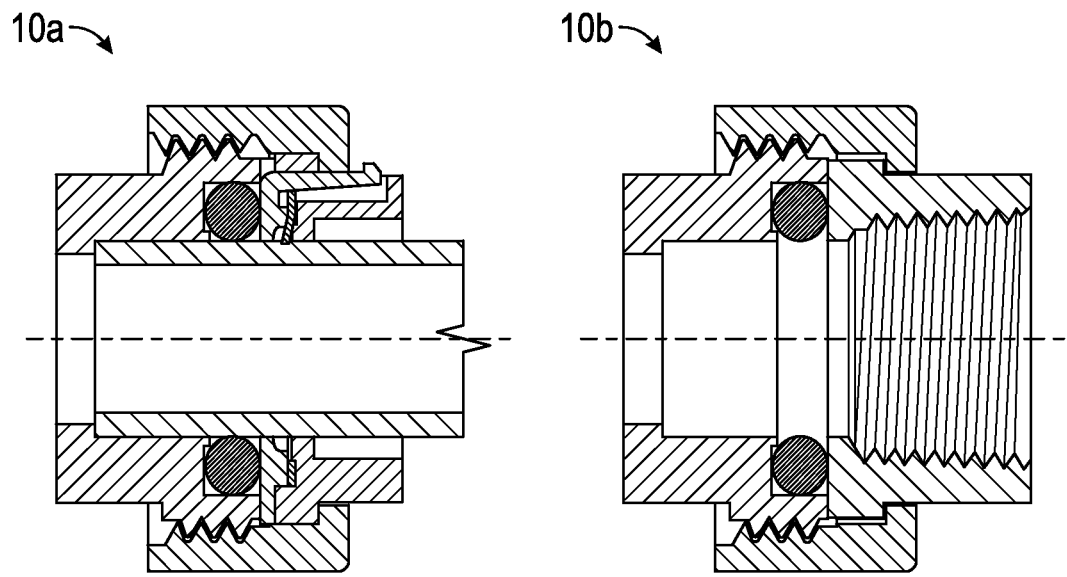
FIG. 1A
(Prior Art)
FIG. 1B
(Prior Art)
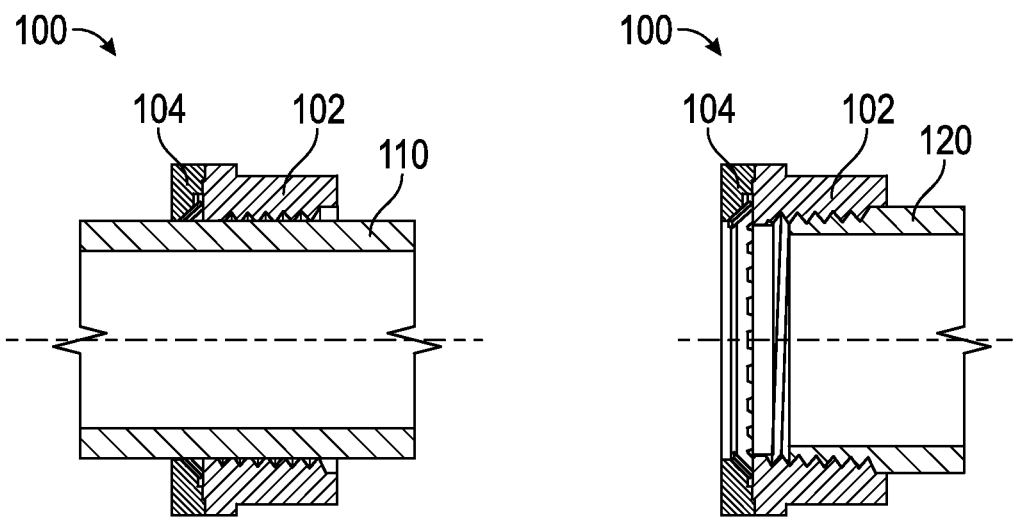
FIG. 2A
FIG. 2B

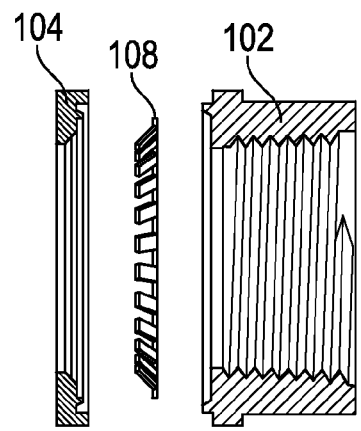
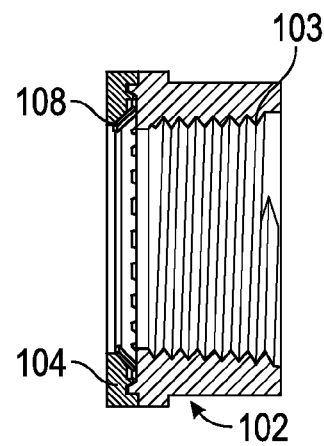
FIG. 4A  FIG. 4B
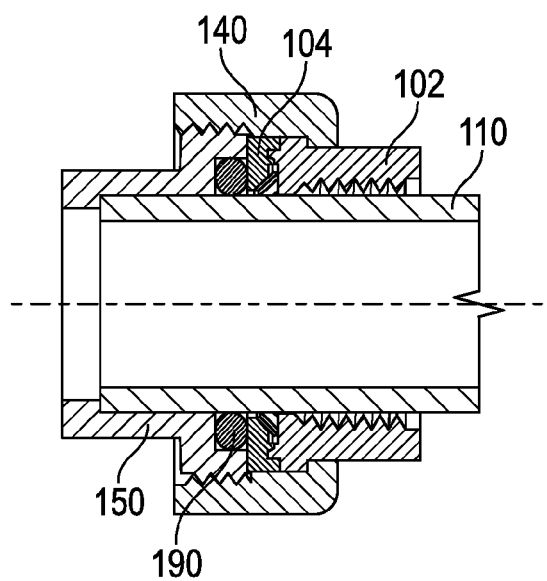
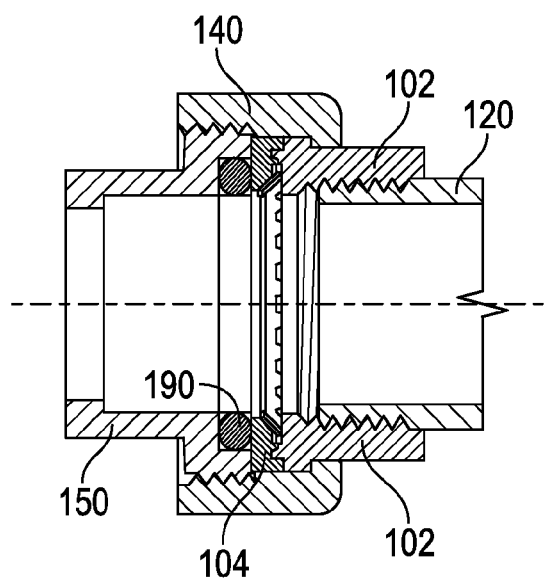
FIG. 5A  FIG. 5B

CONNECTOR ELEMENT

FIELD OF THE DISCLOSURE

The present disclosure relates to a connector. More particularly, the present disclosure relates to universal connector system for securely connecting tubular articles of different configurations.

BACKGROUND

A large number of connectors for connecting tubular articles are known in the prior art. The tubular articles may be coupled together using a connector to form a structure. The structure configured by connecting the plurality of tubular articles is subject to a variety of loads that may be transferred to the coupling in the form of tensile loads or twisting moments. This may adversely affect the coupling between the tubular articles. The coupling configured between the tubular articles by using the connector must be capable of withstanding different loads acting thereon and the connector should be able to hold together the tubular articles, thereby maintaining integrity of the structure. However, conventionally known connectors are complex and fail to securely hold together the tubular articles. Further, conventionally known coupling connectors are difficult to assemble and involve number of parts for configuring a structure. Conventional connectors includes a large number of loose individual parts such as molding thread adapter and nut, lock ring, actuator, support and nut. With so many loose individual parts, the assembling of the tubular articles becomes cumbersome and even if one loose individual part is misplaced, the connection between the tubular articles is not possible and the connector is rendered useless. Furthermore, the conventional connectors fail to connect tubular articles having different dimensions/diameters. Furthermore, the conventional connector lacks flexibility to connect tubular articles of different configurations and can be used for connecting tubular elements of a particular configuration only. Still further, conventional connector fails to connect tubular articles of different materials. Most of the conventionally known coupling connectors involve loose individual parts and fail to securely hold together tubular articles.

Accordingly, there is a need for a connector element that is capable of withstanding different loads acting thereon and is enables securely holding together the tubular articles. Further, there is a need for a connector element that has ability to connect different tubular articles irrespective of the configurations of the tubular elements. Further, there is a need for a connector element that is simple in construction, easy to use and that configures a secure connection between the tubular articles. Further, there is a need for a connector element that requires less number of parts for configuring an assembly between the tubular articles. Still further, there is a need for a connector element that is used for coupling tubular articles having different dimensions/diameters and of different material.

OBJECTS

Some of the objects of the present disclosure which at-least one embodiment is able to satisfy, are described herein below:

It is an object of the present disclosure to ameliorate one or more problems of the prior art or to at least provide a useful alternative.

A primary object of the present disclosure is to provide a connector element that is capable of withstanding different loads acting thereon and enables securely holding together the tubular articles.

Another object of the present disclosure is to provide a connector element that is simple in construction.

Still another object of the present disclosure is to provide a connector element that provides flexibility of connecting tubular articles of different configurations.

Another object of the present disclosure is to provide a connector element that provides modular configuration to enable assembling of different tubular structural elements.

Yet another object of the present disclosure is to provide a connector element that provides for assembling of tubular articles in minimal time period.

Still another object of the present disclosure is to provide a connector element that is easy to use and configure a secure connection between the tubular articles.

Another object of the present disclosure is to provide a connector element that requires less number of parts for assembling the tubular articles.

Yet another object of the present disclosure is to provide a connector element that is used for coupling tubular articles having different dimensions/diameters and of different material.

Still another object of the present disclosure is to provide a connector element that is used for coupling tubular articles of different configurations.

Further, there is a need for a connector element that is used for configuring dual connections, particularly for configuring connection between tubular articles.

Another object of the present invention is to provide a connector element that is used for positively holding and locating tubular articles.

Still another object of the present disclosure is to provide a connector element that is used for adjustably connect tubular articles.

These and other objects of the present disclosure are dealt in great extent by the accompanying drawings and the descriptive matter, in which there are illustrated exemplary embodiments of the disclosure.

SUMMARY

A connector element is disclosed in accordance with one embodiment of the present disclosure. The connector element is for coupling a first tubular element to a second tubular element, wherein the second tubular element is having an end configuration selected from a threaded end configuration and a non-threaded plain configuration. The connector element is having a threaded element complementary to the threads of the threaded end configuration of the second tubular element, a tube lock that is co-axially arranged with respect to and disposed downstream of the threaded element for holding the second tubular element, and a guide element that is co-axially arranged with respect to and disposed down-stream of the tube lock for guiding the second tubular element.

Typically, the threaded element and the guide element of the connector element are co-axially secured to each other.

Typically, the threaded element and the guide element of the connector element are secured by ultrasonic welding.

Alternatively, the threaded element and the guide element of the connector element are secured by spin/friction welding.

Typically, threaded element is adapted to receive and threadably engage with the threads of the threaded end configuration of the second tubular element.

Alternatively, the tube lock engages with an engaging element configured on the non-threaded plain configuration of the second tubular element.

Generally, the threaded element, the tube lock and the guide element of the connector element are functional coupled to the first tubular element by a nut, wherein the nut receives the guide element, the tube lock and at least a portion of the threaded element, and is further adapted to receive and threadably engage with at least a portion of the first tubular element.

Typically, the threaded element is of metal.

Alternatively, the threaded element is of polymeric material.

Generally, the guide element is of metal.

Typically, the guide is of polymeric material.

BRIEF DESCRIPTION

The disclosure will now be explained in relation to the accompanying drawings, in which:

FIG. 1a and FIG. 1b illustrate schematic representations depicting conventional connectors in accordance with the prior art used for connecting tubular articles, wherein the conventional connectors involve use of large number of loose individual parts;

FIG. 2a illustrates schematic representation depicting a connector element, in accordance with the present disclosure, used for configuring connection between tubular elements having non-similar end configurations, wherein the connector element is illustrated to be mounted on one of the tubular articles, particularly, the connector element is illustrated to be mounted on a plain tube;

FIG. 2b illustrates schematic representation depicting a connector element, in accordance with the present disclosure, used for configuring connection between tubular elements having non-similar end configurations, wherein the connector element is illustrated to threadably engage one of the tubular articles, having threads configured on an end portion thereof, with a threaded pipe;

FIG. 4a illustrates an exploded view of the connector element of FIG. 2a and FIG. 2b;

FIG. 4b illustrates an assembled view of the connector element of FIG. 4a;

FIG. 5a illustrates a schematic representation of the connector element of FIG. 2a coupled to a nut for configuring connection between tubular elements having non-similar end configurations, wherein one of the tubular element is a valve body and the other is a plain tube;

FIG. 5b illustrates a schematic representation of the connector element of FIG. 2b coupled to a nut for configuring connection between tubular elements having non-similar end configurations, wherein one of the tubular element is a valve body and the other is a threaded pipe;

Figures 6A, 6B:
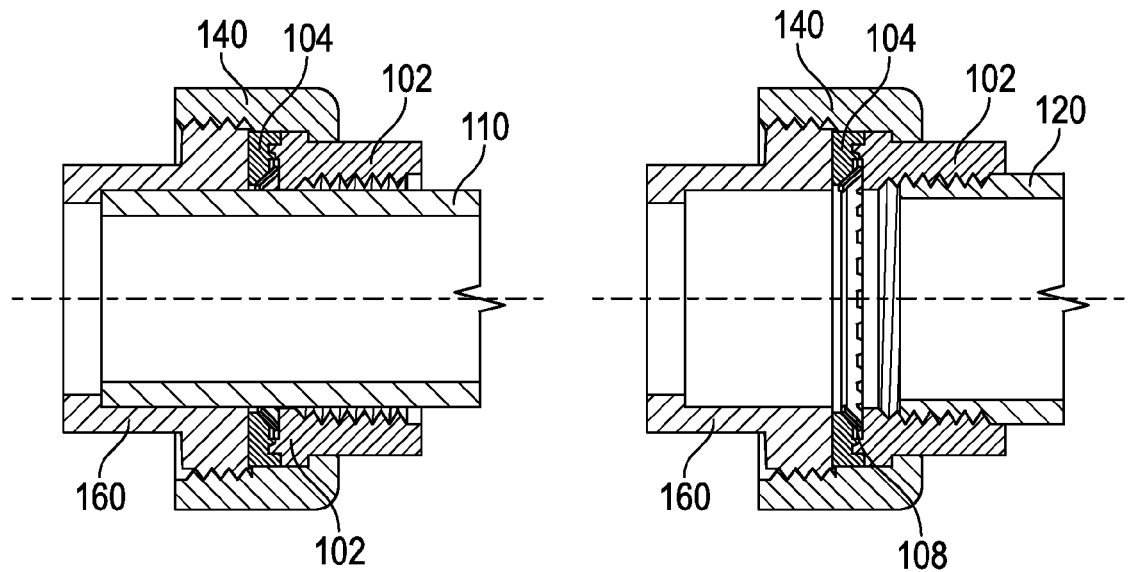

FIG. 6a illustrates a schematic representation of the connector element of FIG. 2a coupled to a nut for configuring connection between tubular elements having non-similar end configurations, wherein one of the tubular element is not a valve body and the other is a plain tube; and FIG. 6b illustrates a schematic representation of the connector element of FIG. 2b coupled to a nut for configuring connection between tubular elements having non-similar end configurations, wherein one of the tubular element is not a valve body and the other is a threaded pipe.

DETAILED DESCRIPTION

The disclosure will now be described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

A large number of connectors for connecting tubular elements/articles are known in the prior art. The tubular articles may be coupled together using a connector to form a structure. The structure configured by connecting the plurality of tubular articles may be subject to a variety of loads that may be transferred to the coupling in the form of tensile loads or twisting moments that may adversely affect the coupling between the tubular articles. The coupling configured between the tubular elements by using the connector must be capable of withstanding different loads acting thereon and the connector should be able to hold together the tubular articles, thereby maintaining integrity of the structure. However, conventional connectors fail to withstand different loads acting thereon and the connector fails to securely hold together the tubular articles. FIG. 1a and FIG. 1b respectively illustrates conventional connectors 10a and 10b for connecting tubular articles. The conventional connectors include a large number of loose individual parts such as molding thread adapter and nut, lock ring, actuator and support and nut. With so many loose individual parts, the assembly between the tubular articles becomes cumbersome and even if one loose individual part is misplaced, the connection between the tubular articles is not possible and the connector is rendered useless. Further, the conventionally known connectors are complex. Still further, the conventional connector lacks flexibility to connect tubular articles of different configurations and can be used for connecting tubular elements of a particular configuration only. Furthermore, with use of the conventional connectors, the coupling between the tubular articles is difficult. Furthermore, conventional connector fails to connect tubular articles of different materials and dimensions/diameters.

The connector element in accordance with the present disclosure is a one piece connector that is capable of withstanding different loads, particularly torsional as well as tensile loads acting thereon and securely holds together the tubular elements of different configurations, particularly, tubular elements having non-similar end configurations. The connector element can be used for configuring connection between tubular articles having threads configured on an end portion thereof, particularly a threaded pipe. Also, the connector element can also be used for connecting tubular articles without threads configured thereon, particularly, a plain tube. The connector element provides flexibility of connecting tubular articles of different configurations and enables assembly of different tubular structural elements having non-similar end configurations to provide modular configuration to a structure. The connector element in accordance with the present disclosure does not include any loose individual parts as such the connector element ameliorates one or more problems associated with conventional connectors that require large number of loose individual parts for configuring the connection. The connector element in accordance with the present disclosure provides modularity, reduces final part count and provides ease of assembly between different tube configurations and provides quick connect feature. The connector element of the present disclosure provides thread connect feature as well as latch connect feature, thereby enabling quick connection between different tube configurations, particularly, tubular elements having non-similar end configurations. The connector element of the present disclosure enables configuring coupling between tubular elements, wherein the connector element is simple in construction and convenient to use.

Figure 3A:
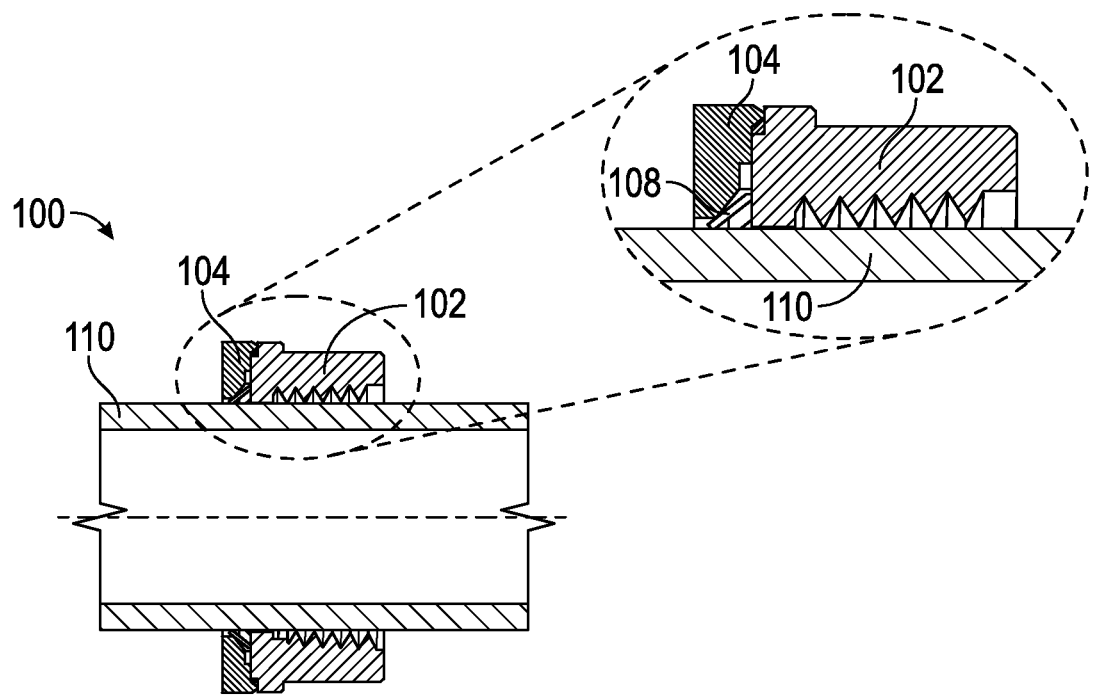
FIG. 3a illustrates a schematic representation of the connector element of FIG. 2a, wherein enlarged view of the connector element mounted on one of the tubular articles, particularly non-threaded plain tube, is illustrated.

FIG. 2a and FIG. 3a illustrates a schematic representation of a connector element 100 in accordance with an embodiment of the present disclosure, wherein the connector element 100 engages with one of the tubular elements, particularly a plain tube 110 for facilitating connection between tubular elements having non-similar end configurations. The connector element 100 has a threaded element 102 complementary to the threads of the threaded end of another tubular element 120 and a guide element 104 to guide the non-threaded, plain end of the tubular element 110 into the connector element 100. Further, the connector element 100 includes a tube lock 108 co-axially disposed between the threaded element 102 and the guide element 104. The tube lock 108 holds the second tubular element. More specifically, the tube lock 108 is co-axially arranged with respect to and disposed downstream of the threaded element 102 and holds the second tubular element 110 and the guide element 104 co-axially arranged with respect to and downstream of said tube lock 108 and guides the second tubular element 110. Particularly referring to FIG. 2a, the connector element 100 is illustrated to engage on a plain tube, wherein the tube lock 108 engages with and holds the plain tube. The connector element 100 includes the threaded element 102, also referred to as a first element, and the guide element 104, also referred to as second element. The threaded element 102 receives at least a portion of the tubular element having a first end configuration, particularly, the non-threaded, plain tube 110. In accordance with an embodiment, the threaded element 102 and the guide element 104 are of plastic material, and the guide element 104 is connected to the threaded element 102 using various plastic joining processes. More specifically, in accordance with an embodiment of the present disclosure, the guide element 104 is connected to the threaded element 102 by using ultrasonic welding. In accordance with yet another embodiment, the guide element 104 is connected to the threaded element 102 by spin/friction welding. In accordance with another embodiment, the threaded element 102 is connected to the guide element 104 and the tube lock 108 is disposed between the threaded element 102 and the guide element 104. Further, either of the threaded element 102 and the guide element 104 secured to form the connector element 100 may be replaced with threaded element 102 and the guide element 104 of different configurations depending upon the end configurations of the tubular elements to be connected. Further, the tube lock 108 may be replaced with another tube lock of different configuration depending upon the end configurations of the tubular elements to be connected. The threaded element 102 and the guide element 104 sandwich the tube lock 108 there-between. In accordance with a preferred embodiment, the guide element facilitates guiding and alignment of the tubular element into the connector element for alignment with the other tubular element for facilitating coupling between the tubular elements. In accordance with another embodiment, the tube lock 108 may be configured with at least one engaging element. The tube lock 108 is engaged with at least a portion of the tubular element 110 and is further functionally coupled to the tubular element 150 or 160 (illustrated in FIG. 5a and FIG. 6a). Such a configuration of the tube lock 108 provides quick connect feature to the connector element 100. In accordance with an embodiment, either of the threaded element 102, that is capable of configuring thread able coupling with the tubular element 120, and the tube lock 108 disposed between the threaded element 102 and the guide element 104, that is capable of configuring latch or snap coupling with the tubular element 110, engages with either of the tubular elements 120 and 110 respectively, depending upon the configuration of the tubular elements 120 and 110. The connector element 100 holding either of the tubular elements 120 and 110 is coupled to the tubular element 150 or 160 via a nut 140 that configures coupling between the tubular element 110 or 120 and the second tubular element 150 or 160. Particularly, the nut 140 facilitates coupling between the guide element 104 and the tubular elements 150, 160 for configuring coupling between the tubular element 110 or 120 and the tubular element 150, 160.

In accordance with an embodiment, the connector element 100 has a threadably engaging arrangement disposed at one end and a quick connect tube lock arrangement, particularly a latch and notch arrangement disposed at the other end. This configuration of the connector element 100 enables the connector element 100 to accommodate a tubular element having threads configured on at least a portion thereof as well accepting tubular element without threads, particularly, a plain pipe, thereby facilitating connection between tubular elements having different or dis-similar end configurations, wherein one of the tubular elements has threads configured on at least one portion thereof and the other tubular element is a plain pipe.

In accordance an embodiment and referring to FIG. 2a and FIG. 3a, the guide element 104 facilitates guiding and aligning of the tubular articles to be coupled to each other. More specifically, the guiding element 104 is co-axially arranged with respect to and down-stream of the tube lock 108 and guides the second tubular element. In accordance with another embodiment, the tube lock 108 disposed between the threaded element 102 and the guide element 104 engages with a complementary engaging element formed on the tubular element 110, in case the first tubular element is a plain tube. The threaded element, the tube lock 108 and the guide element 102 and 104 are functionally coupled to the tubular element 150, that is part of the valve body (as illustrated in FIG. 5a) or the tubular element 160 that is not a part of the valve body (as illustrated in FIG. 6a) for configuring coupling between the tubular element 110 and either of tubular elements 150 or 160. The tube lock 108 is configured with either of the complementary engaging elements of an engaging arrangement. The guide element 104 is secured to the threaded element 102 and is functionally coupled to at least a portion of the tubular article 150 or 160 (not illustrated in FIG. 2a and FIG. 3a) by using the nut 140. The tube lock 108 engages with a complementary engaging element of the engaging arrangement configured on an outer periphery of the tubular article 110, thereby facilitating holding of the tubular element 110 by the connector element 100. The threaded element 102 and the guide element 104 with the tube lock 108 disposed there-between are functionally coupled to either of the tubular elements 150 or 160 for configuring coupling between the tubular element 110 and the tubular element 150 or 160. In accordance with an embodiment, the engaging arrangement is a latch and notch arrangement with a latch element thereof configured on the tube lock 108 (illustrated in FIG. 4a and FIG. 4b), that engages with a notch configured on an outer periphery of the tubular element 110. This configuration facilitates coupling between the tube lock 108 and the tubular element 110, in case the tubular element 110 is a plain tube. Alternatively, the engaging arrangement is a latch and notch arrangement with a latch element thereof configured on an outer periphery of the tubular element 110 that engage with the notch configured on the tube lock 108. The latch and notch arrangement or tube lock connection ensures quick connection between the tubular elements. However, the engaging arrangement is not limited to latch and notch arrangement. In accordance with another embodiment other joints can also be used instead of latch and notch arrangement.

Still further, in accordance with yet another embodiment, screw and nut or self-tapping screw is used as an engaging arrangement. The threaded element 102 and the guide element 104 are further functionally coupled to either of the first tubular elements 150 or 160 by using the nut 140. Referring to FIG. 5a and FIG. 5b, the nut 140 is used for configuring functional coupling between the guide element 104 and either of the tubular elements 150 or 160. The nut 140 receives the guide element 104 and at least a portion of the threaded element 102 along with the tube lock 108 disposed there-between. The nut 140 further receives and threadably engages with at least a portion of the first tubular element 150. Referring to FIG. 5a, an O-ring 190 is disposed between the guide element 104 of the connector element 100 and the tubular element 150, wherein the tubular element 150 is a part of the valve body.

Figure 3B:
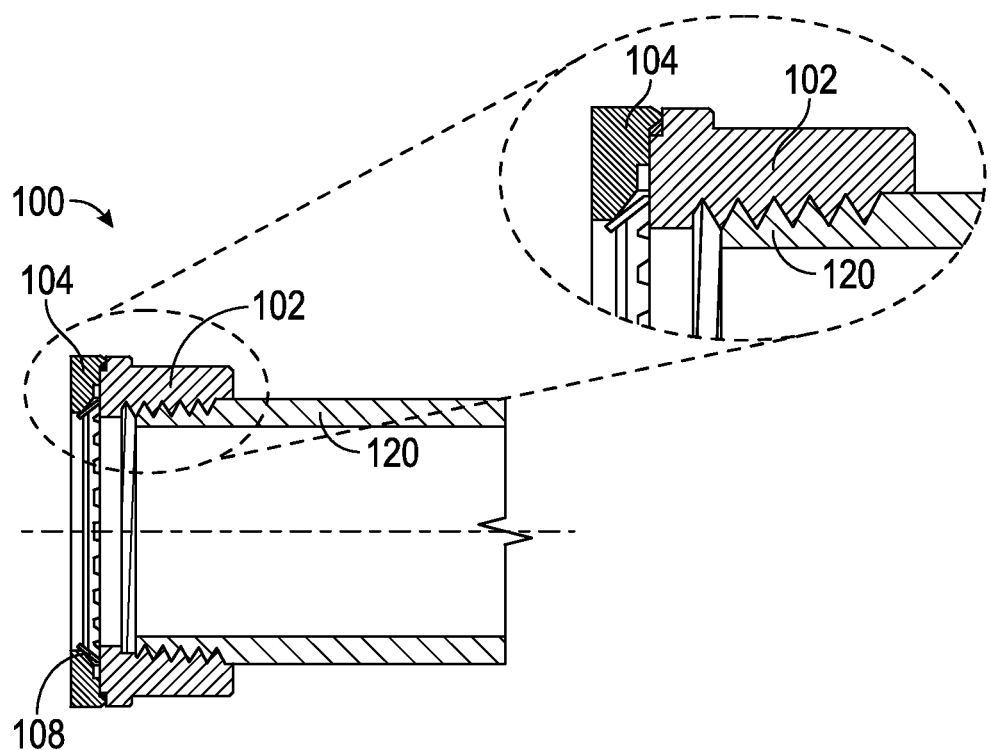
FIG. 3b illustrates a schematic representation of the connector element of FIG. 2b, wherein enlarged views of the connector element threadably engaging with one of the tubular elements having threads configured on an end portion thereof, particularly a threaded pipe is illustrated.

In accordance with a further embodiment, the connector element 100 is used for configuring connection between a tubular element 120 having threaded end configuration and either of the tubular elements 150 or 160. Referring to FIG. 2b and FIG. 3b, schematic representation depicting the connector element 100 used for configuring connection between tubular elements having dis-similar end configurations is illustrated. The threaded element 102 of the connector element 100 illustrated in FIG. 2b and FIG. 3b, threadably engages with one of the tubular elements, particularly tubular element 120 having threads configured on an end portion thereof. More specifically, the threaded element 102 has threads 103 configured on inner walls thereof for facilitating threadable engagement between the threaded element 102 and the tubular article 120 having threads. The threadably engaging arrangement disposed at one end of the connector element 100 is formed by mold in threads 103 defined on the threaded element 102 that engages with the complementary threads formed on at least a portion of the corresponding tubular element 120 for configuring engagement between the threaded element 102 and the tubular element 120. Referring to FIG. 2b and FIG. 3b, the connector element 100 accepts a plastic tube 120 with threads configured on at least a portion thereof. In this case, the guide element 104 and the tube lock 108 are not in contact with the tubular element 120.

More specifically, in accordance with one embodiment, the threaded element 102 threadably engages with a threaded portion of the tubular element 120, in case the tubular article 120 is a threaded pipe. The threaded element 102 and guide element 104 of the connector element 100 along with the tube lock 108 disposed there-between, are functionally coupled with either of the tubular elements 150 or 160 for configuring coupling between the tubular element 120 and either of the tubular elements 150 or 160.

More specifically, the connector element 100 has a tube surface engaging arrangement, particularly a threaded coupling arrangement disposed at one end and a quick connect arrangement, particularly a latch and notch arrangement or tube lock connection disposed at the other end. This configuration of the connector element 100 enables the connector element 100 in accepting both pipe and tubing of different outer diameters and different configurations. The connector element 100 may further include different engaging elements for engaging with tubular elements having different end configurations, thereby providing flexibility for connecting tubular elements having different end configurations.

FIG. 4a illustrates an exploded view of the connector element 100. FIG. 4b illustrates an assembled view of the connector element 100. FIG. 5a illustrates a schematic representation of the connecter element 100 coupled to the first tubular element 150 or 160 by using a nut 140 for configuring connection between tubular elements, wherein one of the tubular elements is a valve body and the other is a plain tube 110. FIG. 5b illustrates a schematic representation of the connector element 100 coupled to a tubular element, wherein one of the tubular element is a valve body and the other is a threaded pipe 120. FIG. 6a illustrates a schematic representation of the connector element 100 used for connecting tubular elements, wherein one of the tubular element is not a valve body and the other is a plain tube 110. FIG. 6b illustrates a schematic representation of the connector element 100 used for connecting tubular elements, wherein one of the tubular element is not a valve body and the other is a threaded pipe 120.

Technical Advantages and Economical Significance

The connector element in accordance with the present disclosure and described herein above has several technical advantages including but not limited to the realization of:
- a connector element that is capable of withstanding different loads, particularly torsional as well as tensile loads acting thereon;
- a connector element that enables securely holding together the tubular elements;
- a connector element that is simple in construction;
- a connector element that provides flexibility of connecting tubular elements of different configurations;
- a connector element that provides modular configuration to a structure by enabling assembly of different tubular elements;
- a connector element that is having quick connect feature for achieving quick assembly of tubular elements;
- a connector element that is easy to use and configure a secure connection between the tubular elements;
- a connector element that requires less number of connecting parts for configuring the assembly between the tubular elements;
- a connector element that can be used for coupling tubular elements having different dimensions/diameters and of different material;

a connector element that can be used for configuring dual connections, particularly for configuring connection between tubular elements, wherein the tubular element can be a threaded tubular element or a non-threaded tubular element; and a connector element that can be used for positively holding and locating tubular elements.

The numerical values given of various physical parameters, dimensions and quantities are only approximate values and it is envisaged that the values higher or lower than the numerical value assigned to the physical parameters, dimensions and quantities fall within the scope of the disclosure and the claims unless there is a statement in the specification to the contrary.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

I claim:

1. A connector element for coupling a first tubular element to a second tubular element, said connector element having
   a threaded element having threads coaxially disposed on an inner surface of the threaded element, said threaded element configured to receive the second tubular element;
   a tube lock co-axially arranged with respect to and disposed downstream of said threaded element;
   a guide element co-axially arranged with respect to and disposed down-stream of said tube lock and adapted to guide said second tubular element; and
   a nut having threads coaxially disposed on an inner surface of the nut, said nut configured to receive said guide element, said tube lock, and at least a portion of said threaded element, said nut further configured to receive and threadably engage with at least a portion of said first tubular element.

2. The connector element as claimed in claim 1, wherein said threaded element and said guide element of said connector element are co-axially secured to each other to form a connection between said threaded element and said guide element.

3. The connector element as claimed in claim 1, wherein said threaded element and said guide element of said connector element are secured by ultrasonic welding.

4. The connector element as claimed in claim 1, wherein said threaded element and said guide element of said connector element are secured by spin/friction welding.

5. The connector element as claimed in claim 1, wherein the second tubular element has a threaded end configuration and said threaded element is adapted to receive and threadably engage with the threads of the threaded end configuration of the second tubular element.

6. The connector element as claimed in claim 1, wherein the second tubular element has a non-threaded end configuration and said tube lock is adapted to engage with an engaging element configured on said non-threaded end configuration of the second tubular element.

7. The connector element as claimed in claim 1, wherein said threaded element, said guide element, and said tube lock of said connector element are coupled to the first tubular element by said nut to couple said first tubular element to said second tubular element.

8. The connector element as claimed in claim 1, wherein said threaded element and said guide element are made of material selected from the group consisting of metal and polymeric material.

* * * * *